(12) United States Patent
Ohama et al.

(10) Patent No.: US 7,691,010 B2
(45) Date of Patent: Apr. 6, 2010

(54) GOLF BALL

(75) Inventors: Keiji Ohama, Kobe (JP); Takahiro Sajima, Kobe (JP); Seiichiro Endo, Kobe (JP)

(73) Assignee: SRI Sports Limited, Kobe (JP)

( * ) Notice: Subject to any disclaimer, the term of this patent is extended or adjusted under 35 U.S.C. 154(b) by 896 days.

(21) Appl. No.: 10/937,331

(22) Filed: Sep. 10, 2004

(65) Prior Publication Data

US 2005/0107189 A1    May 19, 2005

(30) Foreign Application Priority Data

Nov. 17, 2003   (JP) .............................. 2003-386546

(51) Int. Cl.
  *A63B 37/12* (2006.01)
(52) U.S. Cl. ...................................... 473/383
(58) Field of Classification Search .......... 473/378–385
  See application file for complete search history.

(56) References Cited

U.S. PATENT DOCUMENTS

| 4,813,677 | A |   | 3/1989  | Oka et al. |         |
|-----------|---|---|---------|------------|---------|
| 5,072,945 | A | * | 12/1991 | Oka et al. | 473/384 |
| 5,292,132 | A |   | 3/1994  | Oka        |         |
| 6,213,896 | B1|   | 4/2001  | Higuchi et al. |     |
| 6,299,551 | B1|   | 10/2001 | Higuchi et al. |     |
| 6,508,723 | B1| * | 1/2003  | Shimosaka  | 473/351 |
| 6,558,274 | B1| * | 5/2003  | Shimosaka  | 473/351 |
| 6,576,707 | B2|   | 6/2003  | Ohama et al. |       |
| 2002/0034991 | A1 |  | 3/2002  | Sasaki et al. |     |
| 2002/0119838 | A1 |  | 8/2002  | Moriyama et al. |   |
| 2003/0083155 | A1 |  | 5/2003  | Endo et al. |        |
| 2004/0132551 | A1 | * | 7/2004 | Aoyama et al. | 473/378 |

FOREIGN PATENT DOCUMENTS

JP      2003-290391 A    10/2003

* cited by examiner

*Primary Examiner*—Raeann Trimiew
(74) *Attorney, Agent, or Firm*—Birch, Stewart, Kolasch & Birch, LLP

(57) ABSTRACT

A golf ball 2 has a core, a mid layer and a cover. This mid layer comprises 10 parts by weight or greater and 70 parts by weight or less of a thermoplastic elastomer containing a styrene block having a material hardness of less than 10, and 30 parts by weight or greater and 90 parts by weight or less of an ethylene-(meth)acrylic acid copolymer based ionomer resin having a material hardness of 50 or greater and 70 or less. Hardness of this mid layer is less than 40, and the thickness is equal to or less than 1.2 mm. This golf ball 2 has seven kinds of dimples (A to G), each having a different diameter. When all the dimples are arranged in decreasing order of the diameter Di, ratio (Dx/Dn) of the mean diameter Dx of the dimples ranking in the top 10% to the mean diameter Dn of the dimples ranking in the bottom 10% is equal to or greater than 1.30. Standard deviation η of diameters of all the dimples is equal to or less than 0.52.

9 Claims, 11 Drawing Sheets

GOLF BALL

This application claims priority on Patent Application No. 2003-386546 filed in Japan on Nov. 17, 2003.

BACKGROUND OF THE INVENTION

1. Field of the Invention

The present invention relates to golf balls. More particularly, the present invention relates to solid golf balls having a core, a mid layer and a cover.

2. Description of the Related Art

Golf balls have numerous dimples on the surface thereof. A role of the dimples involves causing turbulent flow separation through disrupting the air flow around the golf ball during the flight. This roll is referred to as a "dimple effect". By causing the turbulent flow separation, a separating point of air from the golf ball shifts backwards leading to the reduction of drag. The turbulent flow separation promotes the differentia between the separating points at the upper and lower sides of the golf ball, which results from the backspin, thereby enhancing the lift force that acts upon the golf ball. Excellent dimples disrupt the air flow in a more efficient manner.

In an attempt to improve the flight performance, a variety of proposals have been made with respect to the dimples. U.S. Pat. No. 5,292,132 discloses a golf ball with very densely arranged dimples. U.S. Pat. No. 4,813,677 discloses a golf ball having a dimple pattern with combined dimples having a great diameter and dimples having a small diameter. U.S. Patent Publication No. 2002-119838 discloses a golf ball with dimples of large size.

Previously, prevailing golf balls were two-piece golf balls. In recent years, so called three-piece golf balls having a core, a mid layer and a cover were developed, and have been supplied on the market. U.S. Pat. No. 6,299,551 and U.S. Pat. No. 6,213,896 disclose three-piece golf balls having a mid layer including a thermoplastic elastomer. U.S. Pat. No. 6,576,707 discloses a three-piece golf ball having a mid layer including an ionomer resin and a thermoplastic elastomer.

According to golf balls disclosed in U.S. Pat. No. 6,299,551 and U.S. Pat. No. 6,213,896, a resilience performance of the mid layer is insufficient. A flight performance correlates to the resilience performance. These golf balls are inferior in a flight performance.

According to a golf ball disclosed in U.S. Pat. No. 6,576,707, spin upon a driver shot is apt to be excessive resulting from the mid layer having high hardness. Excessive spin leads to reduction of the flight distance. The mid layer having high hardness also adversely affects a feel at impact.

Concern for golf balls to golf players is the flight performance and feel at impact. There exists room to improve a three-piece golf ball. An object of the present invention is to provide a golf ball which is excellent in a flight performance and feel at impact.

SUMMARY OF THE INVENTION

A golf ball according to the present invention has a core, a mid layer and a cover. This mid layer comprises a thermoplastic elastomer containing a styrene block having a material hardness of less than 10, and an ethylene-(meth)acrylic acid copolymer based ionomer resin having a material hardness of 50 or greater and 70 or less. Amount of the thermoplastic elastomer containing a styrene block to be blended is 10 parts by weight or greater and 70 parts by weight or less per 100 parts by weight of the base polymer. Amount of the ethylene-(meth)acrylic acid copolymer based ionomer resin to be blended is 30 parts by weight or greater and 90 parts by weight or less per 100 parts by weight of the base polymer. Hardness of this mid layer is less than 40. Thickness of this mid layer is equal to or less than 1.2 mm. This golf ball has three or more kinds of dimples, each having a different diameter, on the surface thereof. Occupation ratio of total area of the dimples in the surface area of a phantom sphere is equal to or greater than 75%. When a mean diameter of the dimples having a diameter ranking in the top 10% of the diameters of all the dimples is defined as Dx and a mean diameter of the dimples having a diameter ranking in the bottom 10% of the diameters of all the dimples is defined as Dn, Dx/Dn is equal to or greater than 1.30. Standard deviation η of diameters of all the dimples is equal to or less than 0.52.

A soft thermoplastic elastomer containing a styrene block and a hard ethylene-(meth)acrylic acid copolymer based ionomer resin are used in combination in the mid layer of this golf ball, and the thickness of the mid layer is small. This mid layer is responsible for a favorable feel at impact and an excellent resilience performance. This mid layer is also responsible for optimization of a deformation behavior upon impact with a driver at a relatively slow head speed. Optimization of the deformation behavior results in suppression of the spin, thereby elevating the flight distance. According to this golf ball, it is speculated that Dx/Dn being equal to or greater than 1.30 is responsible for reduction of the drag. According to this golf ball, it is speculated that the standard deviation η being equal to or less than 0.52 is responsible for enhancement of the lift force. This golf ball achieves a great dimple effect irrespective of suppressed spin.

Preferably, the cover comprises a thermoplastic elastomer containing a styrene block having a material hardness of less than 10, and an ethylene-(meth)acrylic acid copolymer based ionomer resin having a material hardness of 50 or greater and 70 or less. Amount of the thermoplastic elastomer containing a styrene block to be blended is 1 part by weight or greater and 30 parts by weight or less per 100 parts by weight of the base polymer. Amount of the ethylene-(meth)acrylic acid copolymer based ionomer resin to be blended is 50 parts by weight or greater and 99 parts by weight or less per 100 parts by weight of the base polymer. Hardness of this cover is equal to or greater than 55. Thickness of this cover is 1.0 mm or greater and 1.8 mm or less.

Preferably, mean value of the diameters of all the dimples is equal to or greater than 4.00 mm. Preferably, the golf ball has five or more kinds of dimples, each having a different diameter, on the surface thereof.

DESCRIPTION OF THE PREFERRED EMBODIMENTS

The present invention is hereinafter described in detail with appropriate references to the accompanying drawing according to the preferred embodiments of the present invention.

Figure 1:
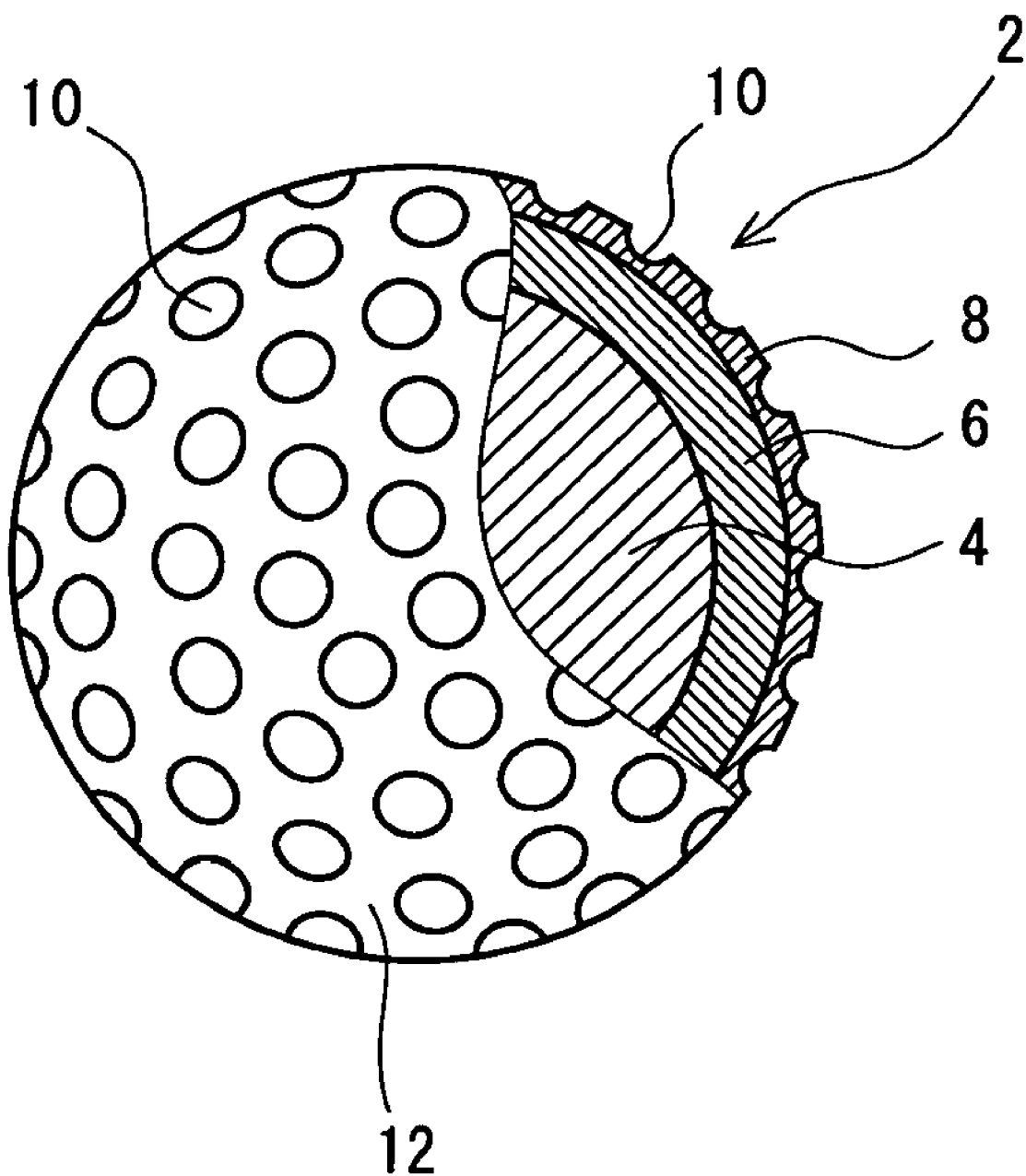
FIG. 1 is a schematic cross-sectional view illustrating a golf ball according to one embodiment of the present invention.

A golf ball 2 depicted in FIG. 1 has a spherical core 4, a mid layer 6 and a cover 8. Numerous dimples 10 are formed on the surface of the cover 8. Of the surface of the golf ball 2, a part except for the dimples 10 is a land 12. Although this golf ball 2 has a paint layer and a mark layer to the external side of the cover 8, these layers are not shown in the Figure. The golf ball may have other layer between the core 4 and the mid layer 6. The golf ball may have other layer between the mid layer 6 and the cover 8.

The cover 8 herein means an outermost layer except for the paint layer and mark layer. Although there exist golf balls referred to as having a cover of a two layered structure, in this instance, the outer layer corresponds to the cover 8 herein.

This golf ball 2 has a diameter of from 40 mm to 45 mm. From the standpoint of conformity to a rule defined by United States Golf Association (USGA), the diameter is preferably equal to or greater than 42.67 mm. In light of suppression of the air resistance, the diameter is preferably equal to or less than 44 mm, and more preferably equal to or less than 42.80 mm. Weight of this golf ball 2 is 40 g or greater and 50 g or less. In light of attainment of great inertia, the weight is preferably equal to or greater than 44 g, and particularly preferably equal to or greater than 45.00 g. From the standpoint of conformity to a rule defined by USGA, the weight is preferably equal to or less than 45.93 g.

The core 4 is generally formed through crosslinking of a rubber composition. Illustrative examples of the base rubber for use in the rubber composition include polybutadienes, polyisoprenes, styrene-butadiene copolymers, ethylene-propylene-diene copolymers and natural rubbers. Two or more kinds of the rubbers may be used in combination. In light of the resilience performance, polybutadienes are preferred. When other rubber is used in combination with a polybutadiene, it is preferred that polybutadiene is included as a principal component. Specifically, it is preferred that percentage of polybutadiene occupied in the entire base rubber is equal to or greater than 50% by weight, and particularly equal to or greater than 80% by weight. High cis-polybutadienes having a percentage of cis-1,4 bindings of equal to or greater than 40%, and particularly equal to or greater than 80% are preferred.

For crosslinking of the core 4, a co-crosslinking agent is usually used. Preferable examples of the co-crosslinking agent in light of the resilience performance include monovalent or bivalent metal salts of α,β-unsaturated carboxylic acid having 2 to 8 carbon atoms. Specific examples of preferable co-crosslinking agent include zinc diacrylate, magnesium diacrylate, zinc dimethacrylate and magnesium dimethacrylate. Zinc diacrylate is particularly preferred on the grounds that a high resilience performance can be achieved.

As a co-crosslinking agent, also an α,β-unsaturated carboxylic acid having 2 to 8 carbon atoms, and a metal oxide may be blended. Both components react in the rubber composition to give a salt. This salt serves as a co-crosslinking agent. Examples of preferable α,β-unsaturated carboxylic acid include acrylic acid and methacrylic acid, and acrylic acid is particularly preferred. Examples of preferable metal oxide include zinc oxide and magnesium oxide, and zinc oxide is particularly preferred.

The amount of the co-crosslinking agent to be blended is preferably 10 parts by weight or greater and 50 parts by weight or less per 100 parts by weight of the base rubber. When the amount to be blended is less than the above range, the resilience performance of the golf ball 2 may become insufficient. In this respect, the amount to be blended is more preferably equal to or greater than 15 parts by weight. When the amount to be blended is beyond the above range, hard feel at impact of the golf ball 2 may be experienced. In this respect, the amount to be blended is particularly preferably equal to or less than 45 parts by weight.

In the rubber composition for use in the core 4, an organic peroxide may be preferably blended together with the co-crosslinking agent. The organic peroxide is responsible for a crosslinking reaction. By blending the organic peroxide, the resilience performance of the golf ball 2 may be improved. Examples of suitable organic peroxide include dicumyl peroxide, 1,1-bis(t-butylperoxy)-3,3,5-trimethylcyclohexane, 2,5-dimethyl-2,5-di(t-butylperoxy)hexane and di-t-butyl peroxide. Particularly versatile organic peroxide is dicumyl peroxide.

The amount of the organic peroxide to be blended is preferably 0.1 part by weight or greater and 3.0 parts by weight or less per 100 parts by weight of the base rubber. When the amount to be blended is less than the above range, the resilience performance of the golf ball 2 may become insufficient. In this respect, the amount to be blended is more preferably equal to or greater than 0.3 part by weight, and particularly preferably equal to or greater than 0.5 part by weight. When the amount to be blended is beyond the above range, hard feel at impact of the golf ball 2 may be experienced. In this respect, the amount to be blended is more preferably equal to or less than 2.8 parts by weight, and particularly preferably equal to or less than 2.5 parts by weight.

To the core 4 may be blended a filler for the purpose of adjusting specific gravity and the like. Illustrative examples of suitable filler include zinc oxide, barium sulfate, calcium carbonate and magnesium carbonate. Powder of highly dense metal may be blended as a filler. Specific examples of the highly dense metal include tungsten and molybdenum. The amount of the filler to be blended is determined ad libitum so that the intended specific gravity of the core 4 can be accomplished. Particularly preferable filler is zinc oxide. Zinc oxide serves not only as a mere agent for adjusting specific gravity but also as a crosslinking activator. Various kinds of additives such as a sulfur compound, an anti-aging agent, a coloring agent, a plasticizer, a dispersant and the like may be blended at an adequate amount to the core 4 as needed. To the core 4 may be also blended crosslinked rubber powder or synthetic resin powder.

Diameter of the core 4 is 36 mm or greater and 41 mm or less. When the diameter is less than the above range, the resilience performance of the golf ball 2 may become insufficient. In this respect, the diameter is more preferably equal to or greater than 37 mm. When the diameter is beyond the above range, durability of the golf ball 2 may become insufficient. In this respect, the diameter is more preferably equal to or less than 40 mm.

Amount of compressive deformation of the core 4 is preferably 3.5 mm or greater and 6.0 mm or less. When the amount of compressive deformation is less than the above range, insufficient feel at impact of the golf ball 2 may be experienced. In this respect, the amount of compressive deformation is more preferably equal to or greater than 4.0 mm, and particularly preferably equal to or greater than 4.5 mm. When the amount of compressive deformation is beyond than the above range, durability of the golf ball 2 may become insufficient. In this respect, the amount of compressive deformation is more preferably equal to or less than 5.5 mm. Upon measurement of the amount of compressive deformation, a spherical body which is a subject for the measurement (core 4) is first placed on a hard plate made of metal. Next, a cylinder made of metal gradually descends toward the spherical body. The spherical body which is intervened between the bottom face of the cylinder and the hard plate is deformed. A migration distance of the cylinder, starting from the state in which initial load of 98 N is applied to the spherical body up to the state in which final load of 1274 N is applied thereto is the amount of compressive deformation.

Crosslinking temperature of the core 4 is usually 140° C. or greater and 180° C. or less. The crosslinking time period of the core 4 is usually 10 minutes or longer and 60 minutes or less. Specific gravity of the core 4 is 0.90 or greater and 1.40 or less. The core 4 may have two or more layers.

For the mid layer 6, a thermoplastic elastomer containing a styrene block and an ethylene-(meth)acrylic acid copolymer based ionomer resin are used through blending.

Examples of the thermoplastic elastomer containing a styrene block include styrene-butadiene-styrene block copolymers (SBS), styrene-isoprene-styrene block copolymers (SIS), styrene-isoprene-butadiene-styrene block copolymers (SIBS), hydrogenated SBS, hydrogenated SIS and hydrogenated SIBS. Exemplary hydrogenated SBS include styrene-ethylene-butylene-styrene block copolymers (SEBS). Exemplary hydrogenated SIS include styrene-ethylene-propylene-styrene block copolymers (SEPS). Exemplary hydrogenated SIBS include styrene-ethylene-ethylene-propylene-styrene block copolymers (SEEPS).

In the present invention, the thermoplastic elastomer containing a styrene block includes alloys of olefin and one or two or more selected from the group consisting of SBS, SIS, SIBS, SEBS, SEPS and SEEPS and hydrogenated products thereof. Olefin component in these alloys is presumed to be responsible for the improvement of compatibility between the thermoplastic elastomer and the ionomer resin. Use of this alloy improves the resilience performance of the golf ball 2. Preferably, olefin having 2 to 10 carbon atoms is used.

Content of the styrene component in the thermoplastic elastomer is preferably 10% by weight or greater and 50% by weight or less. When the content is less than the above range, the resilience performance of the golf ball 2 may become insufficient. In this respect, the content is more preferably equal to or greater than 12% by weight, and particularly preferably equal to or greater than 15% by weight. When the content is beyond the above range, insufficient feel at impact of the golf ball 2 may be experienced. In this respect, the content is more preferably equal to or less than 47% by weight, and particularly preferably equal to or less than 45% by weight.

For this mid layer 6, the thermoplastic elastomer containing a styrene block having a material hardness of less than 10 is used. This thermoplastic elastomer containing a styrene block is responsible for the resilience performance of the golf ball 2. In light of the resilience performance, the material hardness of the thermoplastic elastomer containing a styrene block is more preferably less than 8, and particularly preferably less than 6. The material hardness is usually equal to or greater than 2. According to the present invention, "hardness" means the hardness measured in accordance with a standard of "ASTM-D 2240-68" unless otherwise noted. The measurement is carried out with an automated rubber hardness scale which is equipped with a Shore D type spring hardness scale (trade name "LA1", available from Koubunshi Keiki Co., Ltd.). For the measurement, a sheet which is formed by hot press is used having a thickness of about 2 mm and consisting of the polymer or the polymer composition. Prior to the measurement, the sheet is stored at a temperature of 23° C. for two weeks. Upon the measurement, three sheets are overlaid. According to the present invention, the material hardness means a hardness of a slab consisting of the polymer alone. For a reference, the material hardness of the thermoplastic elastomer containing a styrene block measured in accordance with "JIS K6301" with a type A hardness scale is preferably less than 50, more preferably less than 40, and particularly preferably less than 35.

Specific examples of the thermoplastic elastomer containing a styrene block having the material hardness of less than 10 include "Rabalon® T3339C", a trade name by Mitsubishi Chemical Corporation.

The ethylene-(meth)acrylic acid copolymer based ionomer resin is obtained by the copolymerization of ethylene and acrylic acid or methacrylic acid. This ionomer resin generally contains 70% by weight or greater and 95% by weight or less of an ethylene component, and 5% by weight or greater and 30% by weight or less of an acrylate component or a methacrylate component. Apart of carboxylic acid in the copolymer is neutralized by a metal ion. Illustrative examples of the metal ion for use in neutralization include sodium ion, potassium ion, lithium ion, zinc ion, calcium ion, magnesium ion, aluminum ion and neodymium ion. The neutralization may be carried out with two or more kinds of metal ions. Particularly suitable metal ion in light of the resilience performance and durability of the golf ball 2 is sodium ion, zinc ion, lithium ion and magnesium ion.

For this mid layer 6, the ethylene-(meth)acrylic acid copolymer based ionomer resin having the material hardness of 50 or greater and 70 or less is used. When the material hardness is less than the above range, the resilience performance of the golf ball 2 may become insufficient. In this respect, the material hardness is more preferably equal to or greater than 53, and particularly preferably equal to or greater than 55. When the material hardness is beyond the above range, unfavorable feel at impact of the golf ball 2 may be experienced, and the spin may be excessive. In this respect, the material hardness is more preferably equal to or less than 67, and particularly preferably equal to or less than 65.

Specific examples of the ethylene-(meth)acrylic acid copolymer based ionomer resin having the material hardness of 50 or greater and 70 or less include "Himilan 1555", "Himilan 1557", "Himilan 1605" and "Himilan 1706", trade names by Mitsui-Dupont Polychemical Co. Ltd.; and "Surlyn® 8945" and "Surlyn® 9945", trade names by Dupont.

Amount of the thermoplastic elastomer containing a styrene block having the material hardness of less than 10 in the mid layer 6 is 10 parts by weight or greater and 70 parts by weight or less per 100 parts by weight of the base polymer. Amount of the ethylene-(meth)acrylic acid copolymer based ionomer resin having the material hardness of 50 or greater and 70 or less in the mid layer 6 is 30 parts by weight or greater and 90 parts by weight or less per 100 parts by weight of the base polymer. Excellent compatibility is achieved between the thermoplastic elastomer containing a styrene block having the material hardness of less than 10 and the ethylene-(meth)acrylic acid copolymer based ionomer resin having the material hardness of 50 or greater and 70 or less. Both components are admixed at the molecular level. This mid layer 6 is excellent in strength and resilience performance in spite of the low hardness. When the amount of the thermoplastic elastomer containing a styrene block is less than the above range, insufficient feel at impact of the golf ball 2 may be experienced. In this respect, the amount is more preferably equal to or greater than 25 parts by weight, and particularly preferably equal to or greater than 40 parts by weight. When the amount of the ethylene-(meth)acrylic acid copolymer based ionomer resin is less than the above range, the resilience performance of the golf ball 2 may become insufficient. In this respect, the amount is more preferably equal to or greater than 35 parts by weight, and particularly preferably equal to or greater than 50 parts by weight.

As the base polymer of the mid layer 6, (A) a thermoplastic elastomer containing a styrene block having the material hardness of less than 10,
(B) an ethylene-(meth)acrylic acid copolymer based ionomer resin having the material hardness of 50 or greater and 70 or less and
(C) other polymer may be used. Examples of the other polymer (C) include
(C1) a thermoplastic elastomer containing a styrene block other than that described in (A) above,
(C2) an ionomer resin other than that described in (B) above,
(C3) a thermoplastic polyurethane elastomer,
(C4) a thermoplastic polyamide elastomer,
(C5) a thermoplastic polyester elastomer and
(C6) a thermoplastic polyolefin elastomer.

Specific examples of the thermoplastic elastomer (C1) containing a styrene block other than that described in (A) above include "Epofriend® A1010", a trade name by Daicel Chemical Industries; "Septon HG-252", a trade name by Kuraray Co., Ltd.; and "Rabalon® SJ5400N", "Rabalon® SJ6400N", "Rabalon® SJ7400N", "Rabalon® SJ8400N", "Rabalon® SJ9400N" and "Rabalon® SR04", trade names by Mitsubishi Chemical Corporation.

Specific examples of the ionomer resin (C2) other than that described in (B) above include "Himilan AM7316", a trade name by Du Pont-MITSUI POLYCHEMICAL Co., Ltd.; "Surlyn® 6320", "Surlyn® 8120", "Surlyn® 8320" and "Surlyn® 9320", trade names by Dupont; and "IOTEK 7520", a trade name by Exxon Corporation.

Examples of the thermoplastic polyurethane elastomer (C3) include "Kuramiron", a trade name by Kuraray Co., Ltd., and specific examples thereof include "Kuramiron 9180" and "Kuramiron 9195". Examples of other thermoplastic polyurethane elastomer (C3) include "Elastolan", a trade name by BASF Polyurethane Elastomers Co., Ltd., and specific examples thereof include "Elastolan ET880" and "Elastolan ET890".

Examples of the thermoplastic polyamide elastomer (C4) include "Pebax", a trade name by Toray Industries, Inc., and specific examples thereof include "Pebax 2533".

Examples of the thermoplastic polyester elastomer (C5) include "Hytrel®", a trade name by Du Pont-TORAY Co., LTD., and specific examples thereof include "Hytrel® 4047", "Hytrel® 4767" and "Hytrel® 5557". Examples of other thermoplastic polyester elastomer (C5) include "Primalloy®", a trade name by Mitsubishi Chemical Corporation, and specific examples thereof include "Primalloy® A1500".

Examples of the thermoplastic polyolefin elastomer (C6) include "Milastomer®", a trade name by Mitsui Chemicals, Inc., and specific examples thereof include "Milastomer® M4800NW". Examples of other thermoplastic polyolefin elastomer (C6) include "TPE", a trade name by Sumitomo Chemical Co., Ltd., and specific examples thereof include "TPE 3682" and "TPE 9455".

When the other polymer (C) is used in the mid layer 6, the amount is preferably equal to or less than 10 parts by weight per 100 parts by weight of the entire base polymer. In other words, total amount of the thermoplastic elastomer containing a styrene block having the material hardness of less than 10 (A) and the ethylene-(meth)acrylic acid copolymer based ionomer resin having the material hardness of 50 or greater and 70 or less (B) is preferably equal to or greater than 90 parts by weight per 100 parts by weight of the entire base polymer.

To the mid layer 6 may be blended a filler, a dispersant, a coloring agent and the like in an adequate amount as needed. The mid layer 6 may be blended with powder of a highly dense metal such as tungsten, molybdenum or the like for the purpose of adjusting the specific gravity.

Hardness Hm of the mid layer 6 is less than 40. This mid layer 6 is soft. This mid layer 6 is responsible for the feel at impact of the golf ball 2. According to the golf ball 2 having this mid layer 6, a deformation behavior upon impact with a driver is optimized. On behalf of the optimal deformation behavior, initial spin rate is suppressed, thereby elevating the flight distance. In light of the feel at impact and flight performance, the hardness Hm is more preferably equal to or less than 30, and particularly preferably equal to or less than 25. In light of the resilience performance and durability of the golf ball 2, the hardness Hm is more preferably equal to or greater than 5.

Thickness Tm of the mid layer 6 is equal to or less than 1.2 mm. When the thickness Tm is beyond the above range, the resilience performance of the golf ball 2 may become insufficient. In this respect, the thickness Tm is more preferably equal to or less than 1.1 mm, and particularly preferably equal to or less than 1.0 mm. When the thickness Tm is too small, insufficient feel at impact of the golf ball 2 may be experienced, and the initial spin may be excessive. In this respect, the thickness Tm is preferably equal to or greater than 0.3 mm, and particularly preferably equal to or greater than 0.5 mm.

For the cover 8 are used (A) a thermoplastic elastomer containing a styrene block having the material hardness of less than 10 and (B) an ethylene-(meth)acrylic acid copolymer based ionomer resin having the material hardness of 50 or greater and 70 or less as a base polymer, similarly to the mid layer 6. Both components are excellent in compatibility, and admixed at the molecular level. This cover 8 is responsible for the durability and resilience performance of the golf ball 2.

Amount of the thermoplastic elastomer containing a styrene block having the material hardness of less than 10 (A) in the cover 8 is 1 part by weight or greater and 30 parts by weight or less per 100 parts by weight of the base polymer. Amount of the ethylene-(meth)acrylic acid copolymer based ionomer resin having the material hardness of 50 or greater and 70 or less (B) in the cover 8 is 50 parts by weight or greater and 99 parts by weight or less per 100 parts by weight of the base polymer. When the amount of the thermoplastic elastomer containing a styrene block (A) is less than the above range, insufficient feel at impact of the golf ball 2 may be experienced. In this respect, the amount is more preferably equal to or greater than 5 parts by weight, and particularly preferably equal to or greater than 10 parts by weight. When the amount of the ethylene-(meth)acrylic acid copolymer based ionomer resin (B) is less than the above range, the resilience performance of the golf ball 2 may become insufficient. In this respect, the amount is more preferably equal to or greater than 60 parts by weight, and particularly preferably equal to or greater than 80 parts by weight.

As the base polymer of the cover 8,
(A) a thermoplastic elastomer containing a styrene block having the material hardness of less than 10,
(B) an ethylene-(meth)acrylic acid copolymer based ionomer resin having the material hardness of 50 or greater and 70 or less and
(C) other polymer may be used. Examples of the other polymer (C) include
(C1) a thermoplastic elastomer containing a styrene block other than that described in (A) above,
(C2) an ionomer resin other than that described in (B) above,
(C3) a thermoplastic polyurethane elastomer,
(C4) a thermoplastic polyamide elastomer,
(C5) a thermoplastic polyester elastomer and
(C6) a thermoplastic polyolefin elastomer.

When the other polymer (C) is used in the cover 8, the amount is preferably equal to or less than 30 parts by weight per 100 parts by weight of the entire base polymer. In other words, total amount of the thermoplastic elastomer containing a styrene block having the material hardness of less than 10 (A) and the ethylene-(meth)acrylic acid copolymer based ionomer resin having the material hardness of 50 or greater and 70 or less (B) is preferably equal to or greater than 70 parts by weight per 100 parts by weight of the entire base polymer.

To the cover 8 may be blended a coloring agent such as titanium dioxide, a filler such as barium sulfate, a dispersant, an antioxidant, an ultraviolet absorbent, a light stabilizer, a fluorescent agent, a fluorescent brightening agent and the like in an adequate amount as needed. The cover 8 may be blended with powder of a highly dense metal such as tungsten, molybdenum or the like for the purpose of adjusting the specific gravity.

Hardness Hc of the cover 8 is equal to or greater than 55. This cover 8 is harder than the mid layer 6. This cover 8 is responsible for the resilience performance of the golf ball 2. In light of the resilience performance, the hardness Hc is more preferably equal to or greater than 56, and particularly preferably equal to or greater than 57. In light of the feel at impact of the golf ball 2, the hardness Hc is preferably equal to or less than 65, more preferably equal to or less than 63, and particularly preferably equal to or less than 61.

Thickness Tc of the cover 8 is 1.0 mm or greater and 1.8 mm or less. When the thickness Tc is less the above range, the resilience performance and durability of the golf ball 2 may become insufficient. In this respect, the thickness Tc is more preferably equal to or greater than 1.2 mm, and particularly preferably equal to or greater than 1.3 mm. When the thickness Tc is beyond the above range, insufficient feel at impact of the golf ball 2 may be experienced. In this respect, the thickness Tc is more preferably equal to or less than 1.7 mm.

In light of achievement of both the flight performance and the feel at impact, the difference (Hc−Hm) between the hardness Hc of the cover 8 and the hardness Hm of the mid layer 6 is preferably equal to or greater than 15, more preferably equal to or greater than 20, and particularly preferably equal to or greater than 30. The difference (Hc−Hm) is preferably equal to or less than 50, and more preferably equal to or less than 40.

Ratio (Tc/Tm) of the thickness Tc of the cover 8 to the thickness Tm of the mid layer 6 is preferably 1.2 or greater and 2.0 or less. When the ratio (Tc/Tm) is less than the above range, the resilience performance of the golf ball 2 may become insufficient. In this respect, the ratio (Tc/Tm) is more preferably equal to or greater than 1.3, and particularly preferably equal to or greater than 1.4. When the ratio (Tc/Tm) is beyond the above range, insufficient feel at impact of the golf ball 2 may be experienced, and the initial spin may be excessive. In this respect, the ratio (Tc/Tm) is more preferably equal to or less than 1.8, and particularly preferably equal to or less than 1.7.

Figure 2:
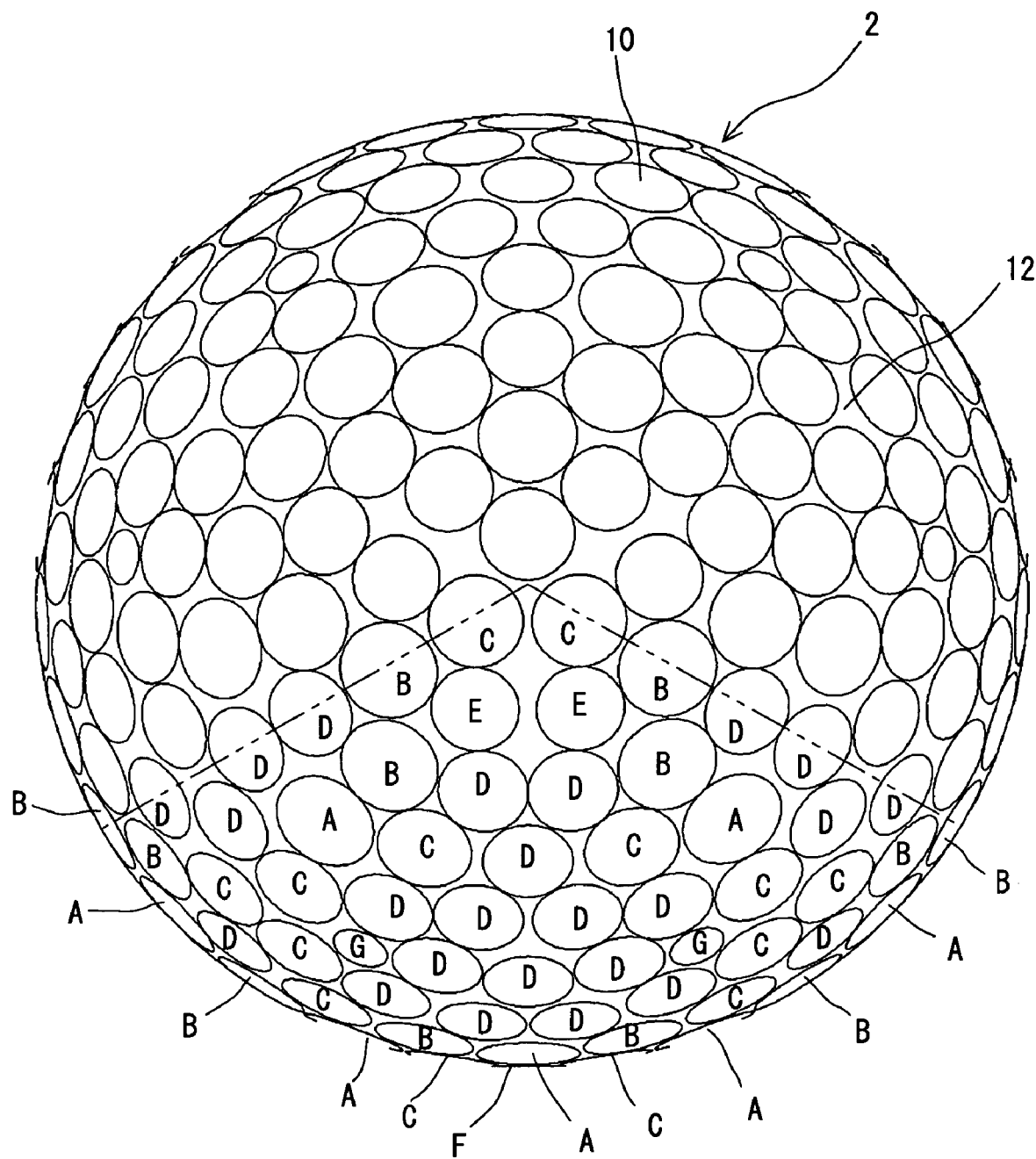
FIG. 2 is an enlarged plan view illustrating the golf ball shown in FIG. 1.
Figure 3:
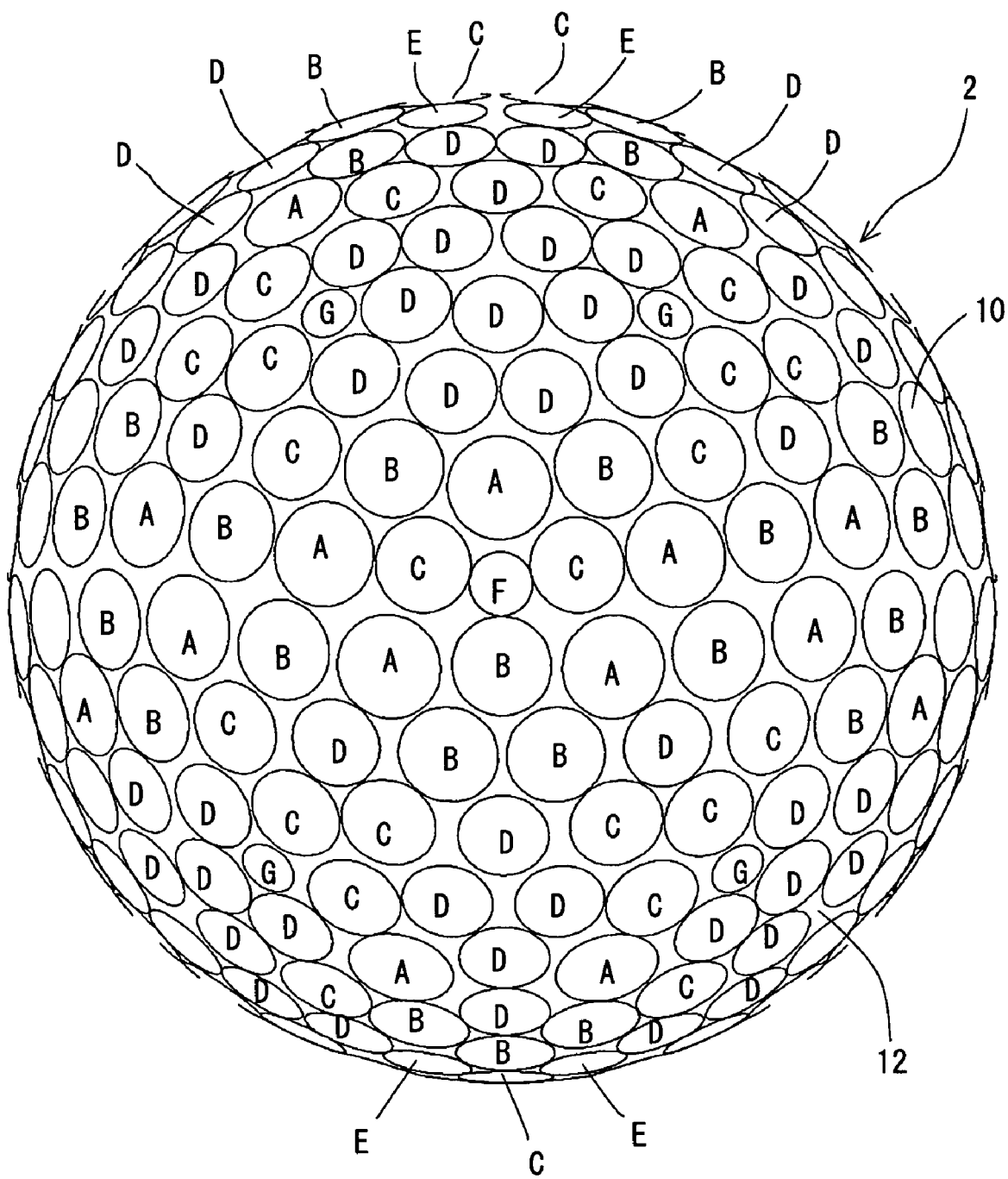
FIG. 3 is a front view illustrating the golf ball shown in FIG. 2.
Figure 4:
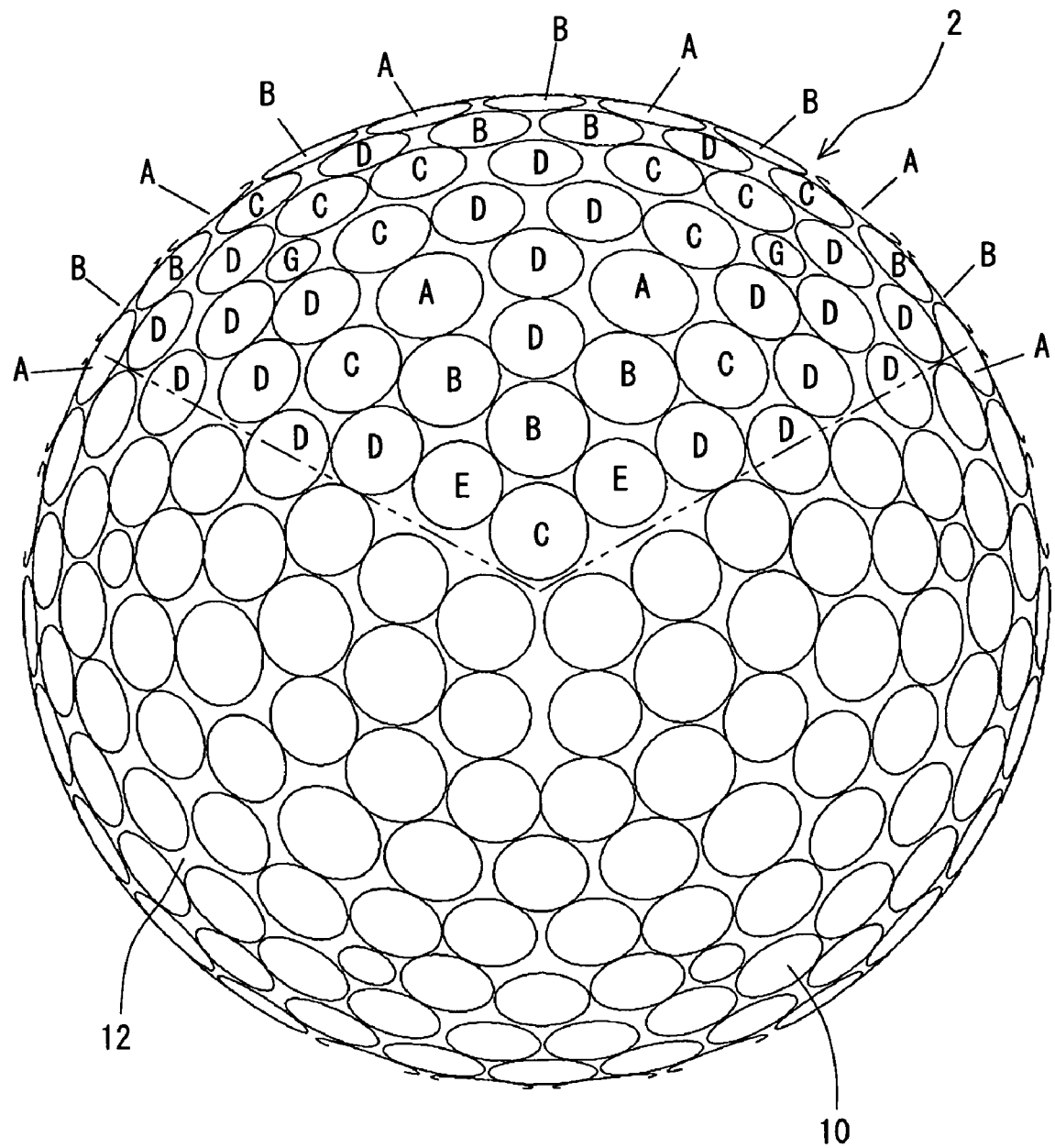
FIG. 4 is a bottom view illustrating the golf ball shown in FIG. 2.

FIG. 2 is an enlarged plan view illustrating the golf ball 2 shown in FIG. 1; FIG. 3 is a front view illustrating the golf ball 2 shown in FIG. 2; and FIG. 4 is a bottom view illustrating the golf ball 2 shown in FIG. 2. As is clear from FIG. 2 to FIG. 4, the plane shape of all the dimples 10 is circular. In FIG. 2 and FIG. 4, kinds of dimples 10 are depicted by symbols A to G in one unit, provided when the surface of the golf ball 2 is comparted into six equivalent units. This golf ball 2 has dimples A having a diameter of 4.65 mm, dimples B having a diameter of 4.45 mm, dimples C having a diameter of 4.25 mm, dimples D having a diameter of 4.05 mm, dimples E having a diameter of 3.95 mm, dimples F having a diameter of 2.80 mm, and dimples G having a diameter of 2.65 mm. Through the combination of multiple kinds of dimples 10, each having a different diameter, the air flow is more efficiently disrupted, thereby reducing the drag. In light of reduction of the drag, it is necessary to provide three or more kinds of dimples 10. It is preferred that 5 or more kinds, yet 6 or more kinds, and particularly 7 or more kinds of dimples 10 are provided. In light of ease of production of the mold, 20 or less kinds of dimples 10 are preferably provided. The golf ball 2 shown in FIG. 2 to FIG. 4 has 7 kinds of dimples 10 designated as A to G.

Even though dimples 10 are designed such that they have the same diameter, there may be a case in which found values obtained by the actual measurement of the diameter are different to some extent due to the error caused during the production. According to the present invention, dimples 10 exhibiting the difference of less than 0.05 mm between both found values obtained by the actual measurement of the diameter is are regarded to fall within the same kind.

According to the golf ball 2 shown in FIG. 2 to FIG. 4, the number of the dimples A is 42; the number of the dimples B is 66; the number of the dimples C is 72; the number of the dimples D is 126; the number of the dimples E is 12; the number of the dimples F is 3; and the number of the dimples G is 12. Total number of the dimples 10 of this golf ball 2 is 333.

Figure 5:
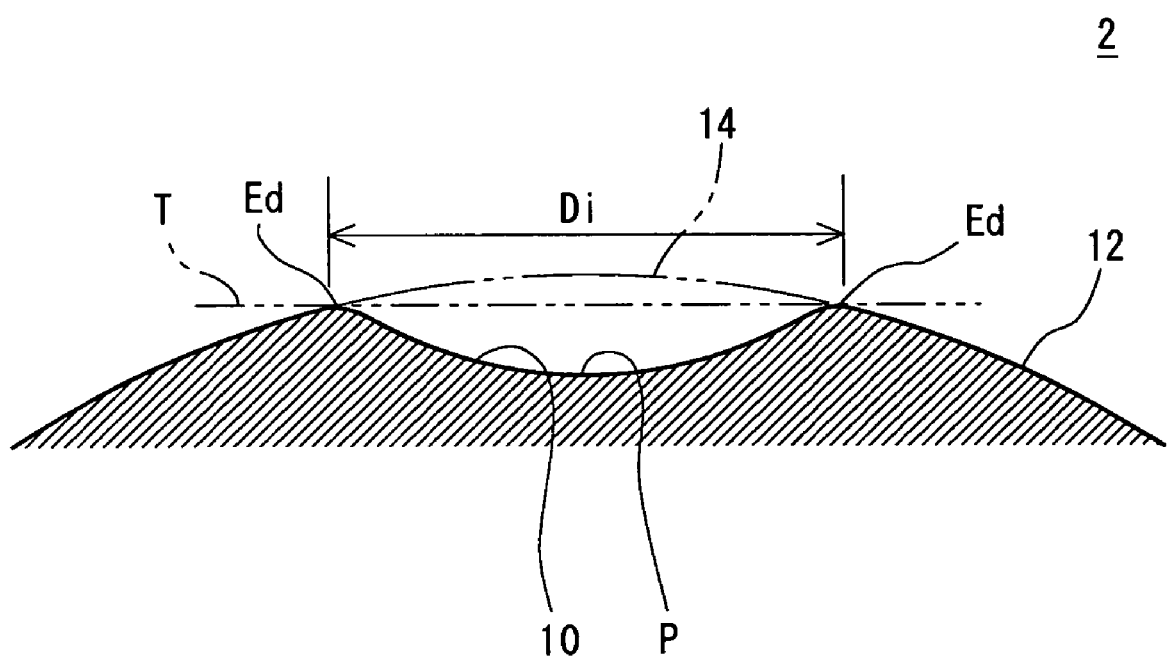
FIG. 5 is an enlarged cross-sectional view illustrating a part of the golf ball shown in FIG. 1.

FIG. 5 is an enlarged cross-sectional view illustrating a part of the golf ball 2 shown in FIG. 1. In this Figure, a face traversing the deepest place P of the dimple 10 and the center of the golf ball 2 is depicted. Vertical direction in FIG. 5 is the in-depth direction of the dimple 10. The in-depth direction refers to a direction from the weighted center of area of the dimple 10 toward the center of the golf ball 2. What is depicted by a chain double-dashed line 14 in FIG. 5 is a phantom sphere. The surface of the phantom sphere 14 corresponds to a surface of the golf ball 2 when it is postulated that there is no dimple 10 existed. The dimple 10 is recessed from the phantom sphere 14. The land 12 agrees with the phantom sphere 14.

What is depicted by a both-sided arrow Di in FIG. 5 is a diameter of the dimple 10. This diameter Di is a distance between one contact point Ed and another contact point Ed, provided when a tangent line T which is common to both sides of the dimple 10 is depicted. The contact point Ed is also an edge of the dimple 10. The edge Ed defines the contour of the dimple 10. The diameter Di is preferably 2.00 mm or greater and 6.0 mm or less. When the diameter Di is less than the above range, the dimple effect is hardly achieved. In this respect, the diameter Di is more preferably equal to or greater than 2.20 mm, and particularly preferably equal to or greater than 2.40 mm. When the diameter Di is beyond the above range, fundamental feature of the golf ball 2 which is substantially a sphere may be compromised. In this respect, the diameter Di is more preferably equal to or less than 5.8 mm, and particularly preferably equal to or less than 5.6 mm.

It is preferred that mean value Da of the diameters Di of all the dimples 10 is equal to or greater than 4.00 mm. A dimple pattern in which the mean value Da is equal to or greater than 4.00 mm results in more efficient disruption of air flow. In this respect, the mean value Da is more preferably equal to or greater than 4.10 mm, and particularly preferably equal to or greater than 4.15 mm. When the mean value Da is too great, fundamental feature of the golf ball 2 which is substantially a sphere may be compromised. In this respect, the mean value Da is preferably equal to or less than 5.00 mm, and more preferably equal to or less than 4.95 mm. The mean value Da in the golf ball 2 shown in FIG. 2 to FIG. 4 is calculated by the following formula:

$$Da=(4.65*42+4.45*66+4.25*72+4.05*126+3.95*12+2.80*3+2.65*12)/333.$$

The mean value Da of this golf ball 2 is 4.18 mm.

According to the present invention, a mean diameter of the dimples 10 ranking in the top 10%, when all the dimples 10 are arranged in decreasing order of the diameter Di, is represented by Dx (mm). Because total number of the dimples 10 of the golf ball 2 shown in FIG. 2 to FIG. 4 is 333, a mean diameter of the dimples 10 ranking in the top 33 is represented by Dx (mm) in this golf ball 2. As described above, this golf ball 2 has 42 dimples A having the diameter Di of 4.65 mm. Therefore, 33 dimples among the dimples A shall fall under the "dimples 10 ranking in the top 10%". According to this golf ball 2, Dx is 4.65 mm.

According to the present invention, a mean diameter of the dimples 10 ranking in the bottom 10%, when all the dimples 10 are arranged in decreasing order of the diameter Di, is represented by Dn (mm). Because total number of the dimples 10 of the golf ball 2 shown in FIG. 2 to FIG. 4 is 333, a mean diameter of the dimples 10 ranking in the bottom 33 is represented by Dn (mm) in this golf ball 2. As described above, this golf ball 2 has six dimples G having the diameter Di of 2.65 mm, three dimples F having the diameter Di of 2.80 mm, 12 dimples E having the diameter Di of 3.95 mm, and 126 dimples D having the diameter Di of 4.05 mm. Thus, dimples G, dimples F and dimples E shall fall under the "dimples ranking in the bottom 10%". Further, six dimples among the dimples D shall also fall under the "dimples ranking in the bottom 10%". Dn of this golf ball 2 is calculated by the following formula:

$$Dn=(2.65*12+2.80*3+3.95*12+4.05*6)/33.$$

According to this golf ball 2, Dn is 3.39 mm.

According to the present invention, Dx/Dn is equal to or greater than 1.30. In other words, the difference in diameters between those of the dimples 10 ranking in the top and the dimples 10 ranking in the bottom is great in this dimple pattern. This dimple pattern is rich in variety. This dimple pattern is speculated to reduce the drag. In this respect, Dx/Dn is more preferably equal to or greater than 1.33, and particularly preferably equal to or greater than 1.36. When Dx is too great, fundamental feature of the golf ball 2 which is substantially a sphere may be compromised. To the contrary, when Dn is too small, dimple effect achieved by the dimples 10 ranking in the bottom 10% may be insufficient. Dx is preferably 3.5 mm or greater and 6.0 mm or less, while Dn is preferably 2.0 mm or greater and 4.0 mm or less. Dx/Dn is preferably equal to or less than 3.00, and more preferably equal to or less than 2.64. Dx/Dn in the golf ball 2 shown in FIG. 2 to FIG. 4 is 1.37.

Standard deviation η of the diameters Di for all the dimples 10 is equal to or less than 0.52. In other words, less fluctuation of frequency distribution of diameters of the dimples 10 is found in this golf ball 2. A dimple pattern with the small standard deviation η irrespective of Dx/Dn being equal to or greater than 1.30 is speculated to cause a great lift force. In this respect, the standard deviation η is more preferably equal to or less than 0.45, and particularly preferably equal to or less than 0.40. Because too small standard deviation η results in insufficient reduction of the drag, the standard deviation η is preferably equal to or greater than 0.15, and particularly preferably equal to or greater than 0.20. Because the mean value Da of diameters Di in the golf ball 2 shown in FIG. 2 to FIG. 4 is 4.18 as described above, the standard deviation η in this golf ball 2 is calculated by the following formula:

$$\eta=(((4.65-4.18)^2*42+(4.45-4.18)^2*66+(4.25-4.18)^2*72+(4.05-4.18)^2*126+(3.95-4.18)^2*12+(2.80-4.18)^2*3+(2.65-4.18)^2*12)/333)^{1/2}.$$

The standard deviation η in this golf ball 2 is 0.39.

Area s of the dimple 10 is an area of a region surrounded by the edge line when the center of the golf ball 2 is viewed at infinity (i.e., an area of the plane shape). The area s is calculated by the following formula:

$$s=(Di/2)^2*\pi.$$

In the golf ball 2 shown in FIG. 2 to FIG. 4, the area of the dimple A is 16.98 mm$^2$; the area of the dimple B is 15.55 mm$^2$; the area of the dimple C is 14.19 mm$^2$; the area of the dimple D is 12.88 mm$^2$; the area of the dimple E is 12.25 mm$^2$; the area of the dimple F is 6.16 mm$^2$; and the area of the dimple G is 5.52 mm$^2$.

In the present invention, ratio of summation of areas s of all the dimples 10 occupied in the surface area of the phantom sphere 14 is referred to as an occupation ratio. From the standpoint that a sufficient dimple effect is achieved, the occupation ratio is preferably equal to or greater than 75%, more preferably equal to or greater than 77%, and particularly preferably equal to or greater than 79%. Usually, the occupation ratio is equal to or less than 90%. According to the golf ball shown in FIG. 2 to FIG. 4, total area of the dimples 10 is 4616.1 mm$^2$. Because the surface area of the phantom sphere 14 of this golf ball 2 is 5728.0 mm$^2$, the occupation ratio is 80.6%.

In FIG. 5, a distance between the tangent line T and the deepest place P is the depth of the dimple 10. It is preferred that the depth is 0.05 mm or greater and 0.60 mm or less. When the depth is less than the above range, a hopping trajectory may be provided. In this respect, the depth is more preferably equal to or greater than 0.08 mm, and particularly preferably equal to or greater than 0.10 mm. When the depth is beyond than the above range, a dropping trajectory may be provided. In this respect, the depth is more preferably equal to or less than 0.45 mm, and particularly preferably equal to or less than 0.40 mm.

According to the present invention, "volume of the dimple" means the volume surrounded by a plane including the contour of the dimple 10 and the surface of the dimple 10. It is preferred that total volume of the dimples 10 is 250 mm$^3$ or greater and 400 mm$^3$ or less. When the total volume is less than the above range, a hopping trajectory may be provided. In this respect, the total volume is more preferably equal to or greater than 260 mm³, and particularly preferably equal to or greater than 270 mm³. When the total volume is beyond the above range, a dropping trajectory may be provided. In this respect, the total volume is more preferably equal to or less than 390 mm³, and particularly preferably equal to or less than 380 mm³.

It is preferred that total number of the dimples 10 is 200 or greater and 500 or less. When the total number is less than the above range, the dimple effect is hardly achieved. In this respect, the total number is more preferably equal to or greater than 240, and particularly preferably equal to or greater than 260. When the total number is beyond the above range, achievement of the dimple effect may be difficult due to small size of the individual dimples 10. In this respect, the total number is more preferably equal to or less than 480, and particularly preferably equal to or less than 460.

EXAMPLES

Example 1

A rubber composition was obtained by kneading 100 parts by weight of polybutadiene (trade name "BR-11", available from JSR Corporation), 24 parts by weight of zinc diacrylate, 5 parts of zinc oxide, an adequate amount of barium sulfate, 0.5 part by weight of bis(pentabromophenyl)disulfide and 0.6 part by weight of dicumyl peroxide. This rubber composition was placed into a mold having upper and lower mold half each having a spherical cavity, and heated at a temperature of 170° C. for 30 minutes to obtain a core having a diameter of 37.5 mm. A type c resin composition listed in Table 2 below was covered around this core by a compression molding method to form a mid layer having the thickness Tm of 1.0 mm. This spherical body comprising the core and the mid layer was placed into a mold having numerous protrusions on the inside face, followed by injection of a type X resin composition listed in Table 3 below around the spherical body according to an injection molding method to form a cover having a thickness of 1.6 mm. Numerous dimples having a shape inverted from the shape of the protrusion were formed on the cover. Dimple pattern is as type I listed in Table 4 below. Paint was applied on this cover to give a golf ball of Example 1 having a diameter of 42.7 mm and weight of about 45.4 g.

Examples 2 to 3 and Comparative Examples 1 to 6

In a similar manner to Example 1 except that specifications of the core, mid layer cover and dimples were as listed in Table 5 and Table 6 below, golf balls of Examples 2 to 3 and Comparative Examples 1 to 6 were obtained. Specifications of the core are listed in Table 1 below; specifications of the mid layer are listed in Table 2 below; specifications of the cover are listed in Table 3 below; and specifications of the dimples are listed in Table 4 below.

TABLE 1

Rubber composition of core

|  | Type i | Type ii |
|---|---|---|
| BR-18 | 100 | 100 |
| Zinc diacrylate | 24 | 26 |
| Zinc oxide | 5 | 5 |
| Barium sulfate | adequate amount | adequate amount |
| Bis (pentabromophenyl) disulfide | 0.5 | 0.5 |
| Dicumyl peroxide | 0.6 | 0.6 |

TABLE 2

Resin composition of mid layer

|  | Type a | Type b | Type c | Type d | Type e |
|---|---|---|---|---|---|
| Himilan 1605 (Material hardness: 61) | 35 | 20 | 30 | — | — |
| Himilan 1706 (Material hardness: 60) | 35 | 15 | 25 | — | — |
| Primalloy ® A1500 (Material hardness: 17) | — | — | — | — | 100 |
| Elastolan ET880 (Material hardness: 30) | — | — | — | 100 | — |
| Rabalon ® SR04 (Material hardness: 10) | 30 | — | — | — | — |
| Rabalon ® T3339C (Material hardness: 7) | — | 65 | 45 | — | — |
| Hardness Hm (Shore D) | 51 | 25 | 38 | 30 | 17 |

TABLE 3

Resin composition of cover

|  | Type X | Type Y | Type Z |
|---|---|---|---|
| Himilan 1605 (Material hardness: 61) | 35 | 50 | 50 |
| Himilan 1706 (Material hardness: 60) | 35 | 40 | 50 |
| Surlyn ® 8120 (Material hardness: 39) | 30 | — | — |
| Rabalon ® T3339C (Material hardness: 7) | — | 10 | — |
| Titanium dioxide | 2 | 2 | 2 |
| Barium sulfate | 2 | 2 | 2 |
| Hardness Hc (Shore D) | 56 | 59 | 63 |

TABLE 4

Specification of dimples

|  | Kind | Number | Diameter Di (mm) | Depth (mm) | Volume (mm³) | Plan view | Front view | Bottom view |
|---|---|---|---|---|---|---|---|---|
| Type I | A | 42 | 4.65 | 0.135 | 1.148 | FIG. 2 | FIG. 3 | FIG. 4 |
|  | B | 66 | 4.45 | 0.134 | 1.043 |  |  |  |
|  | C | 72 | 4.25 | 0.134 | 0.952 |  |  |  |

TABLE 4-continued

Figure 6:
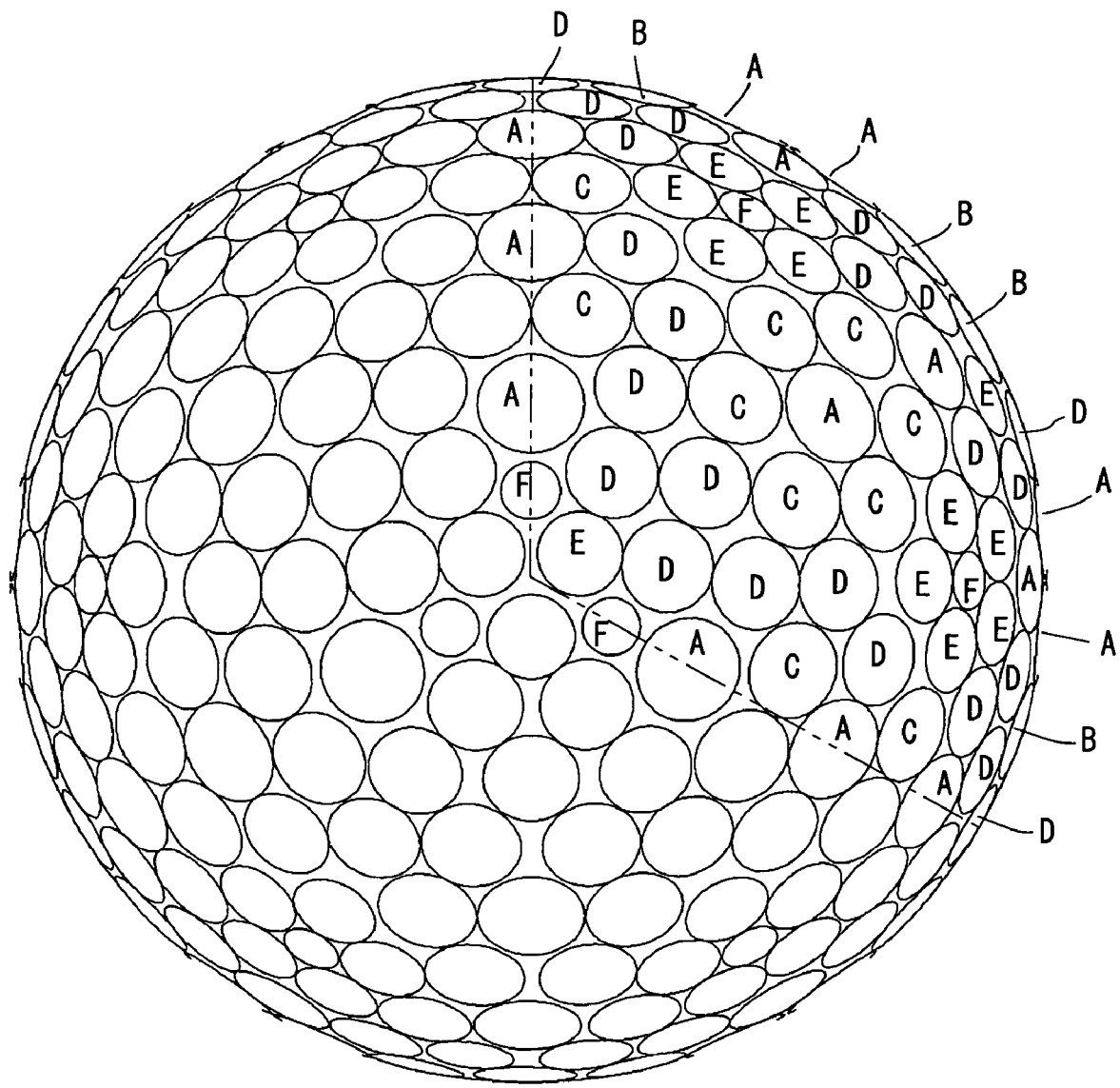
FIG. 6 is a plan view illustrating a golf ball according to Example 3, Comparative Example 2 and Comparative Example 3.
Figure 7:
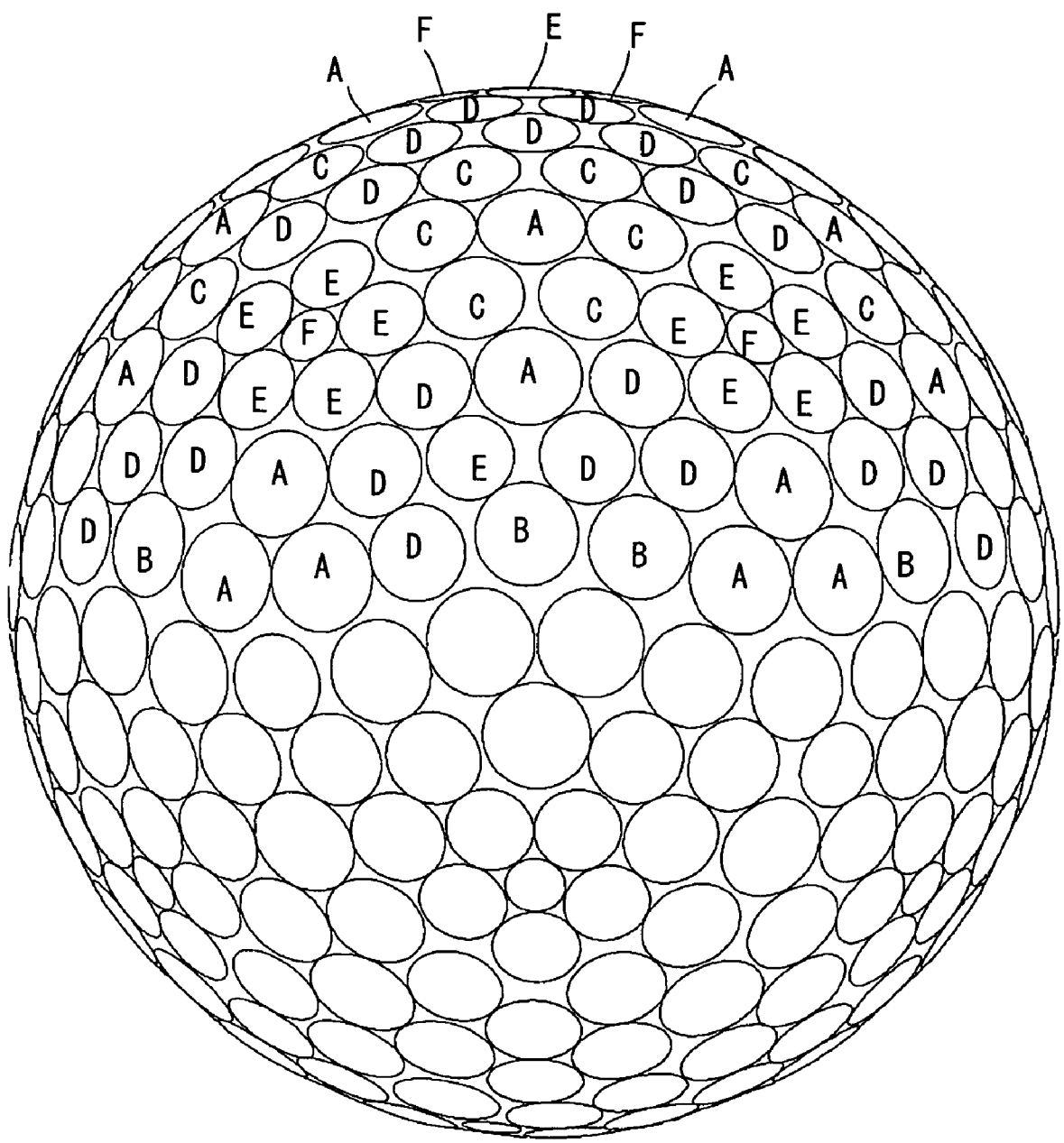
FIG. 7 is a front view illustrating the golf ball shown in FIG. 6.
Figure 8:
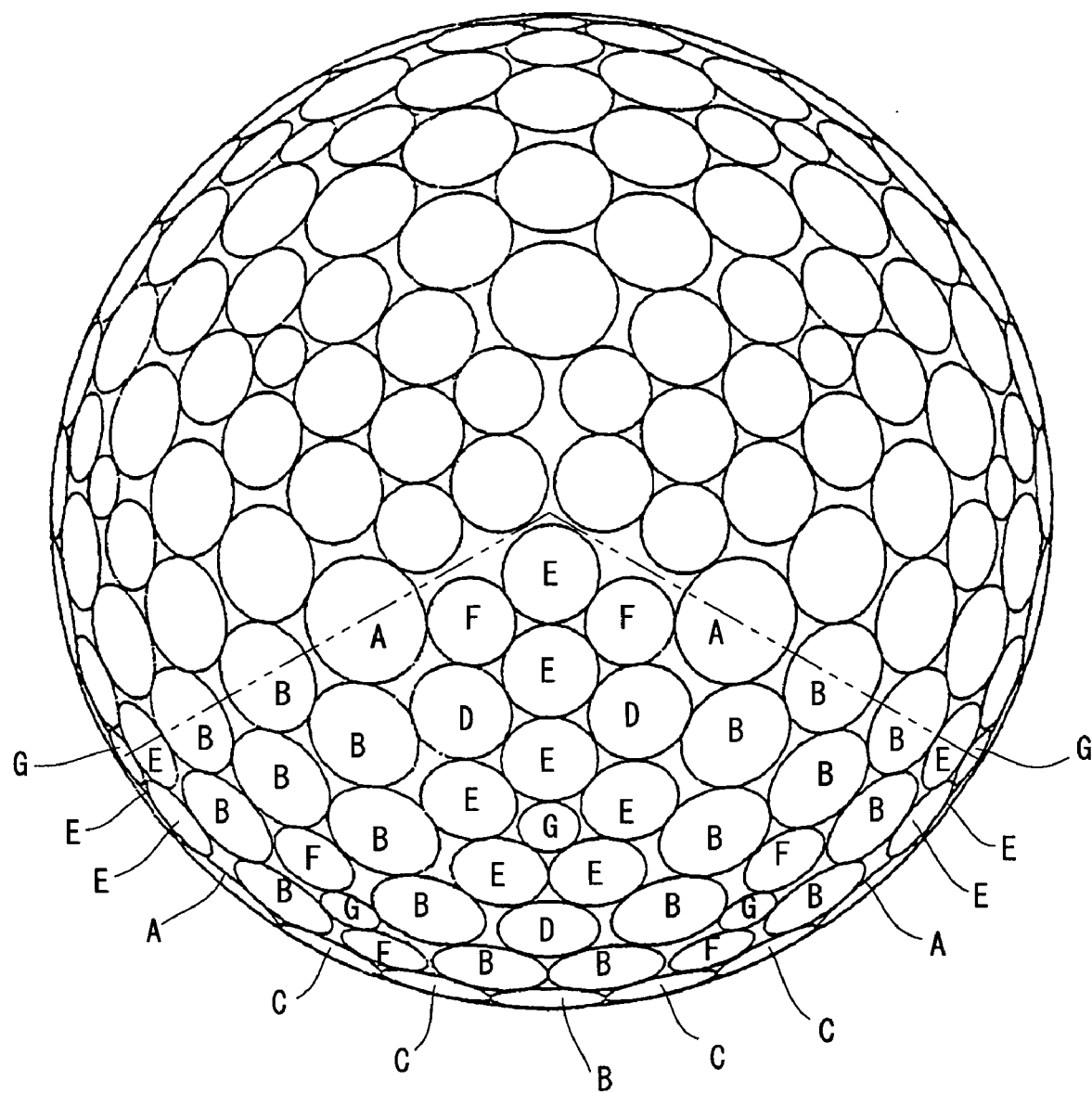
FIG. 8 is a plan view illustrating a golf ball according to Comparative Example 5.
Figure 9:
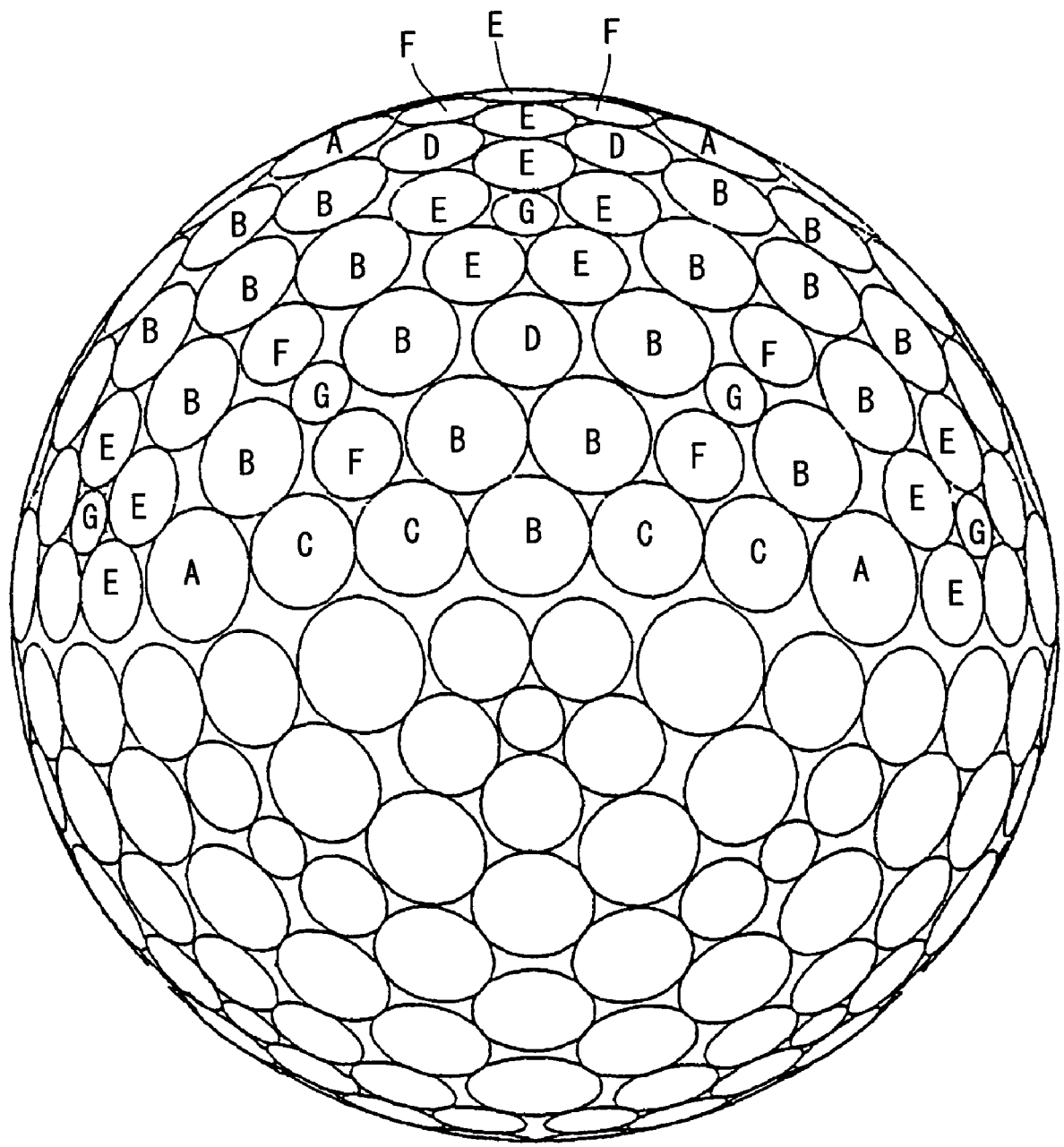
FIG. 9 is a front view illustrating the golf ball shown in FIG. 8.
Figure 10:
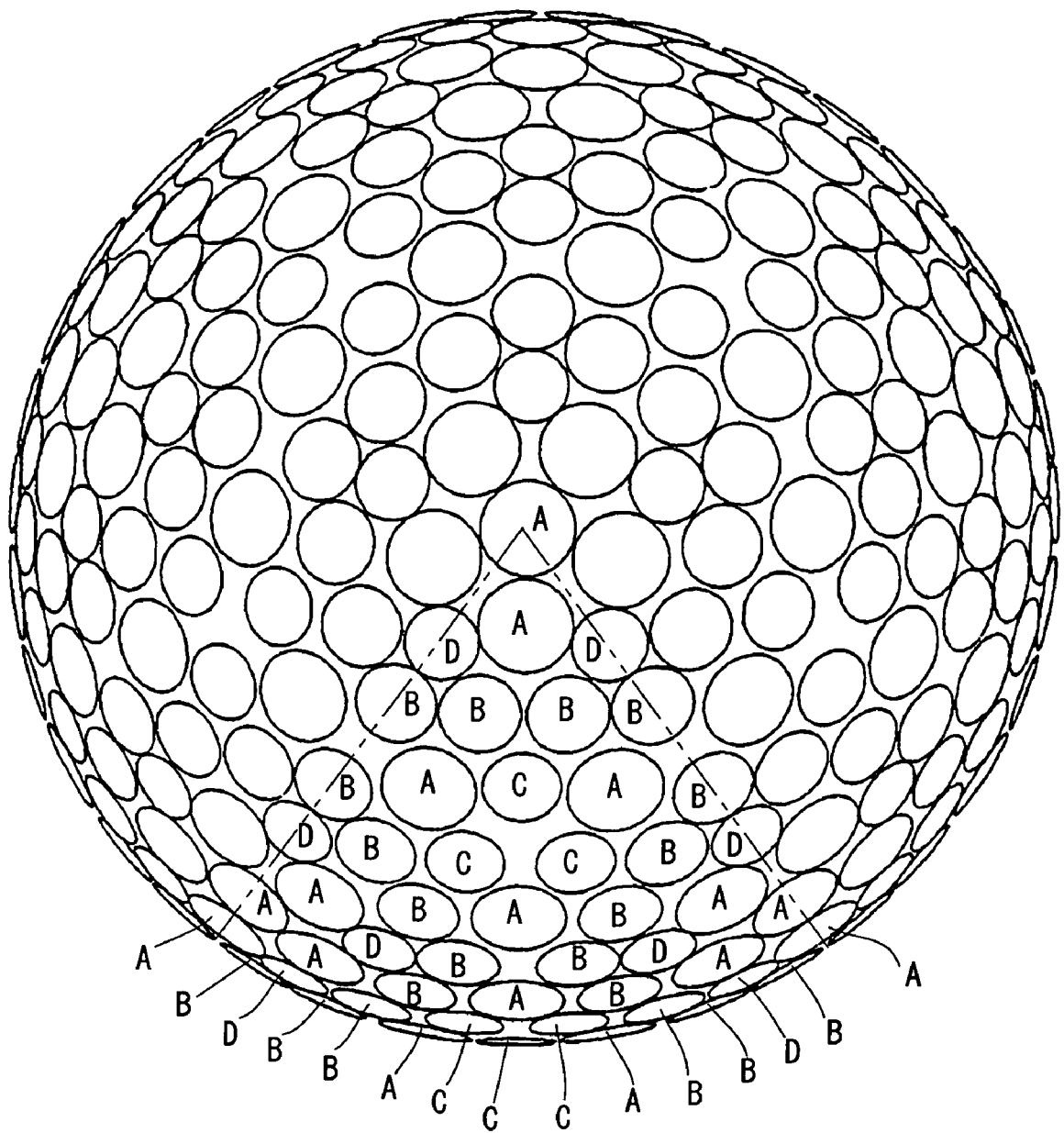
FIG. 10 is a plan view illustrating a golf ball according to Comparative Example 6.
Figure 11:
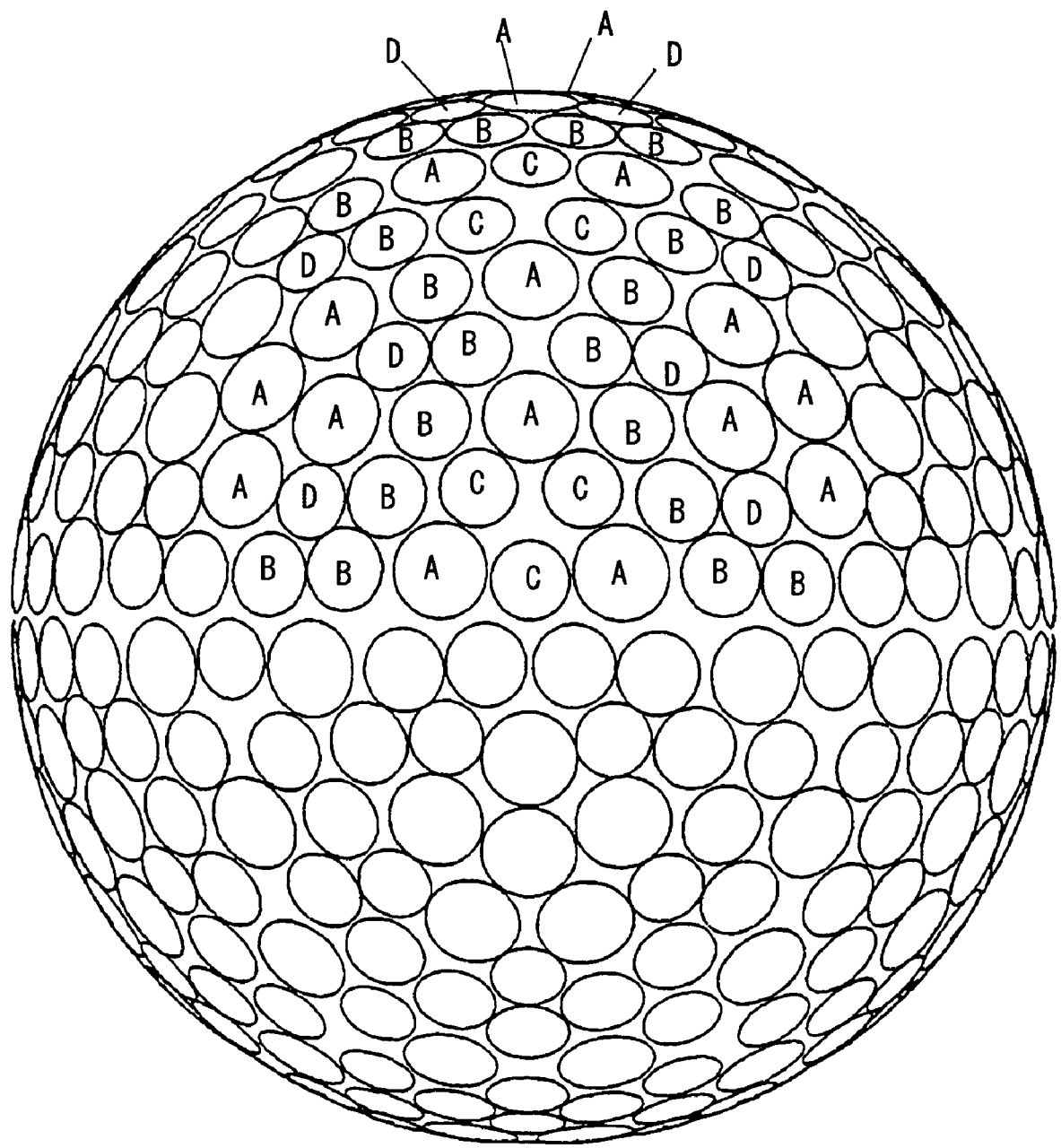
FIG. 11 is a front view illustrating the golf ball shown in FIG. 10.

| | Kind | Number | Diameter Di (mm) | Depth (mm) | Volume (mm³) | Plan view | Front view | Bottom view |
|---|---|---|---|---|---|---|---|---|
| | D | 126 | 4.05 | 0.134 | 0.864 | | | |
| | E | 12 | 3.95 | 0.133 | 0.816 | | | |
| | F | 3 | 2.80 | 0.132 | 0.408 | | | |
| | G | 12 | 2.65 | 0.132 | 0.365 | | | |
| Type II | A | 66 | 4.55 | 0.135 | 1.099 | FIG. 6 | FIG. 7 | — |
| | B | 24 | 4.35 | 0.130 | 0.967 | | | |
| | C | 60 | 4.25 | 0.125 | 0.888 | | | |
| | D | 132 | 4.05 | 0.125 | 0.806 | | | |
| | E | 72 | 3.70 | 0.125 | 0.673 | | | |
| | F | 18 | 2.55 | 0.125 | 0.320 | | | |
| Type III | A | 18 | 5.60 | 0.131 | 1.614 | FIG. 8 | FIG. 9 | — |
| | B | 102 | 5.10 | 0.128 | 1.307 | | | |
| | C | 24 | 4.85 | 0.128 | 1.185 | | | |
| | D | 18 | 4.50 | 0.127 | 1.011 | | | |
| | E | 72 | 4.25 | 0.126 | 0.891 | | | |
| | F | 36 | 3.90 | 0.127 | 0.761 | | | |
| | G | 24 | 2.75 | 0.127 | 0.379 | | | |
| Type IV | A | 132 | 4.10 | 0.141 | 0.931 | FIG. 10 | FIG. 11 | — |
| | B | 180 | 3.55 | 0.132 | 0.654 | | | |
| | C | 60 | 3.40 | 0.132 | 0.601 | | | |
| | D | 60 | 3.25 | 0.133 | 0.553 | | | |

[Measurement of Resilience Coefficient]

To the golf ball was impacted a hollow cylinder made of aluminum of which weight being 200 g at a velocity of 40 m/s. Then, velocity of the hollow cylinder prior to and after the impact, and the velocity of the golf ball after the impact were measured to determine the resilience coefficient of the golf ball. Mean values of data which resulted from 12 times measurement are shown in Table 5 and Table 6 below as indices on the basis of the resilience coefficient of the golf ball of Comparative Example 1 being postulated as 1.00.

[Travel Distance Test]

A driver with a metal head (trade name "XXIO", available from Sumitomo Rubber Industries, Ltd., shaft hardness: R, loft angle: 11°) was equipped with a swing machine, available from True Temper Co. Then the golf ball was hit under the condition of the head speed being 40 m/sec. Accordingly, the distance from the launching point to the point where the ball stopped was measured. Mean values of 12 times measurement are shown in Table 5 and Table 6 below.

[Evaluation of Feel at Impact]

Using a driver, the golf balls were hit by 10 golf players. Those which were evaluated as favorable in the feel at impact by 8 or more golf players were assigned "A"; those which were evaluated as favorable by from 6 to 7 golf players were assigned "B", those which were evaluated as favorable by from 4 to 5 golf players were assigned "C", and those which were evaluated as favorable by 3 or less golf players were assigned "D". The results are presented in Table 5 and Table 6 below.

TABLE 5

Results of evaluation

| | | Example 1 | Example 2 | Example 3 | Comp. Example 1 | Comp. Example 2 |
|---|---|---|---|---|---|---|
| Core | Composition type | i | ii | ii | i | i |
| | Diameter (mm) | 37.5 | 37.5 | 37.5 | 35.5 | 36.3 |
| | Crosslinking temperature (° C.) | 170 | 170 | 170 | 170 | 170 |
| | Crosslinking time (min) | 30 | 30 | 30 | 30 | 30 |
| | Amount of compressive deformation (mm) | 4.4 | 3.9 | 3.9 | 4.4 | 4.4 |
| Mid layer | Composition type | c | b | b | a | c |
| | Hardness Hm (Shore D) | 38 | 28 | 28 | 51 | 38 |
| | Thickness Tm (mm) | 1.0 | 1.0 | 1.0 | 1.8 | 1.6 |
| Cover | Composition type | X | Y | Y | Z | Y |
| | Hardness Hc (Shore D) | 59 | 59 | 59 | 63 | 59 |
| | Thickness Tc (mm) | 1.6 | 1.6 | 1.6 | 1.8 | 1.6 |
| Dimple | Type | I | I | II | I | II |
| | Number of kinds | 7 | 7 | 6 | 7 | 6 |
| | Total number | 333 | 333 | 372 | 333 | 372 |
| | Total volume (mm³) | 309.9 | 309.9 | 309.6 | 309.9 | 309.6 |
| | Mean diameter (mm) | 4.18 | 4.18 | 4.05 | 4.18 | 4.05 |
| | Occupation ratio (%) | 80.6 | 80.6 | 84.6 | 80.6 | 84.6 |
| | Dx (mm) | 4.65 | 4.65 | 4.55 | 4.65 | 4.55 |
| | Dn (mm) | 3.39 | 3.39 | 3.14 | 3.39 | 3.14 |
| | Dx/Dn | 1.37 | 1.37 | 1.45 | 1.37 | 1.45 |

TABLE 5-continued

Results of evaluation

|  | Example 1 | Example 2 | Example 3 | Comp. Example 1 | Comp. Example 2 |
|---|---|---|---|---|---|
| η | 0.39 | 0.39 | 0.43 | 0.39 | 0.43 |
| Hc-Hm (mm) | 21 | 31 | 31 | 12 | 21 |
| Tc/Tm | 1.6 | 1.6 | 1.6 | 1.0 | 1.0 |
| Resilience coefficient (index) | 1.01 | 1.02 | 1.02 | 1.00 | 0.99 |
| Flight distance (m) | 194 | 195 | 194 | 193 | 191.5 |
| Feel at impact | A | A | A | C | A |

TABLE 6

Results of evaluation

| | | Comp. Example 3 | Comp. Example 4 | Comp. Example 5 | Comp. Example 6 |
|---|---|---|---|---|---|
| Core | Composition type | ii | ii | i | i |
| | Diameter (mm) | 37.5 | 37.5 | 37.5 | 37.5 |
| | Crosslinking temperature (° C.) | 170 | 170 | 170 | 170 |
| | Crosslinking time (min) | 30 | 30 | 30 | 30 |
| | Amount of compressive deformation (mm) | 3.9 | 3.9 | 4.4 | 4.4 |
| Mid layer | Composition type | d | e | c | c |
| | Hardness Hm (ShoreD) | 30 | 17 | 38 | 38 |
| | Thickness Tm (mm) | 1.0 | 1.0 | 1.0 | 1.0 |
| Cover | Composition type | Y | X | Y | Y |
| | Hardness Hc (Shore D) | 59 | 56 | 59 | 59 |
| | Thickness Tc (mm) | 1.6 | 1.6 | 1.6 | 1.6 |
| Dimple | Type | II | I | III | IV |
| | Number of kinds | 6 | 7 | 7 | 4 |
| | Total number | 372 | 333 | 294 | 432 |
| | Total volume (mm$^3$) | 309.6 | 309.9 | 309.7 | 309.9 |
| | Mean diameter (mm) | 4.05 | 4.18 | 4.53 | 3.66 |
| | Occupation ratio (%) | 84.6 | 80.6 | 84.7 | 79.7 |
| | Dx (mm) | 4.55 | 4.65 | 5.41 | 4.10 |
| | Dn (mm) | 3.14 | 3.39 | 2.95 | 3.25 |
| | Dx/Dn | 1.45 | 1.37 | 1.84 | 1.26 |
| | η | 0.43 | 0.39 | 0.72 | 0.31 |
| Hc-Hm (mm) | | 29 | 39 | 21 | 21 |
| Tc/Tm | | 1.6 | 1.6 | 1.6 | 1.6 |
| Resilience coefficient (index) | | 0.99 | 0.97 | 1.01 | 1.01 |
| Flight distance (m) | | 192 | 192 | 193 | 192 |
| Feel at impact | | A | B | A | A |

As is shown in Table 5 and Table 6, the golf balls of Examples are excellent in both flight performance and feel at impact. Accordingly, advantages of the present invention are clearly indicated by these results of evaluation.

The present invention is suited for not only three-layered golf balls having a core, a mid layer and a cover, but also for golf balls having four or more layers. The description herein above is anyhow just for one example, and therefore, various modifications can be made without departing from the principles of the present invention.

What is claimed is:

1. A golf ball which comprises a core, a mid layer and a cover,
said mid layer comprising 10 parts by weight or greater and 70 parts by weight or less of a thermoplastic elastomer containing a styrene block having a material hardness of less than 10, and 30 parts by weight or greater and 90 parts by weight or less of an ethylene-(meth)acrylic acid copolymer based ionomer resin having a material hardness of 50 or greater and 70 or less, per 100 parts by weight of the base polymer, wherein said mid layer has a shore D hardness of less than 40, and said mid layer has a thickness of equal to or less than 1.2 mm,
said golf ball having three or more kinds of dimples, each having a different diameter, on the surface thereof,
an occupation ratio of the total area of the dimples in the surface area of a phantom sphere being equal to or greater than 75%,
a ratio Dx/Dn being equal to or greater than 1.30, wherein a mean diameter of the dimples having a diameter ranking in the top 10% of the diameters of all the dimples is defined as Dx and a mean diameter of the dimples having a diameter ranking in the bottom 10% of the diameters of all the dimples is defined as Dn, and
a standard deviation η of diameters of all the dimples being equal to or less than 0.52.

2. The golf ball according to claim 1, wherein said cover comprises one part by weight or greater and 30 parts by weight or less of a thermoplastic elastomer containing a styrene block having a material hardness of less than 10, and 50 parts by weight or greater and 99 parts by weight or less of an ethylene-(meth)acrylic acid copolymer based ionomer resin having a material hardness of 50 or greater and 70 or less, per 100 parts by weight of the base polymer, said cover having a hardness of equal to or greater than 55, and said covering having a thickness of 1.0 mm or greater and 1.8 mm or less.

3. The golf ball according to claim 1, wherein the mean value of the diameters of all the dimples is equal to or greater than 4.00 mm.

4. The golf ball according to claim 1, which comprises five or more kinds of dimples, each having a different diameter, on the surface thereof.

5. The golf ball according to claim 1, wherein the thermoplastic elastomer containing a styrene block has a material hardness of less than 8.

6. The golf ball according to claim 1, wherein the thermoplastic elastomer containing a styrene block has a material hardness of less than 6.

7. The golf ball according to claim 1, wherein the thermoplastic elastomer containing a styrene block has a material hardness of less than 2.

8. The golf ball according to claim 1, wherein the ethylene-(meth)acrylic acid copolymer based ionomer resin has a material hardness of 53 or greater and 67 or less.

9. The golf ball according to claim 1, wherein the ethylene-(meth)acrylic acid copolymer based ionomer resin has a material hardness of 55 or greater and 65 or less.

* * * * *